(12) United States Patent
Finseth et al.

(10) Patent No.: US 7,634,790 B2
(45) Date of Patent: *Dec. 15, 2009

(54) METHOD AND APPARATUS FOR SHARING VIEWING PREFERENCES

(75) Inventors: Craig A. Finseth, St. Paul, MN (US);
Jeffrey A. Brown, Roseville, MN (US);
Philip E. Hsiao, Eden Prairie, MN (US);
Robert G. Arsenault, Redondo Beach, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 723 days.

This patent is subject to a terminal disclaimer.

(21) Appl. No.: 10/925,826

(22) Filed: Aug. 25, 2004

(65) Prior Publication Data

US 2005/0028207 A1    Feb. 3, 2005

Related U.S. Application Data

(63) Continuation of application No. 09/535,638, filed on Mar. 24, 2000, now Pat. No. 6,813,775.

(60) Provisional application No. 60/126,572, filed on Mar. 29, 1999.

(51) Int. Cl.
*H04N 5/445* (2006.01)
*G06F 13/00* (2006.01)
*G06F 3/00* (2006.01)

(52) U.S. Cl. ............................... 725/46; 725/9; 725/14; 725/34; 709/204

(58) Field of Classification Search ............... 725/9, 725/14, 34, 46; 709/204, 205
See application file for complete search history.

(56) References Cited

U.S. PATENT DOCUMENTS

| 5,530,469 | A |   | 6/1996  | Garfinkle |       |
|-----------|---|---|---------|-----------|-------|
| 5,561,708 | A |   | 10/1996 | Remillard |       |
| 5,758,257 | A |   | 5/1998  | Herz et al. |     |
| 5,758,259 | A |   | 5/1998  | Lawler    |       |
| 5,790,935 | A | * | 8/1998  | Payton    | 725/91 |
| 5,828,839 | A |   | 10/1998 | Moncreiff |       |
| 5,872,588 | A |   | 2/1999  | Aras et al. |     |
| 5,886,732 | A |   | 3/1999  | Humpleman |       |
| 6,005,861 | A |   | 12/1999 | Humpleman |       |

(Continued)

FOREIGN PATENT DOCUMENTS

EP           0854645 A2    7/1998

(Continued)

*Primary Examiner*—Hunter B. Lonsberry

(57) ABSTRACT

A method, apparatus, and article of manufacture for sharing viewer preference information between a first user and a second user is disclosed. The method comprises the step of storing first user viewer preference information characterizing media programs selected by the first user in a memory of first device, and transmitting at least a portion of the first viewer preference information to a second user for storage in a memory of a second user device. The article of manufacture comprises a data storage device tangible embodying instructions to perform these method steps. The apparatus comprises a first user device which includes at least one receiver for receiving media programs and second user viewer preference, a processor, a memory for storing viewer preference information characterizing the media programs selected by the first user and a transmitter, for transmitting viewer preferences information to a second user device.

40 Claims, 16 Drawing Sheets

```
                                      ┌─ 192
    ┌─────────────────────────────────────────────┐
    │                                             │
    │      SET UP SENDING TO A NEW DESTINATION    │
    │         NAME "FRED" PHONE "555-1234"        │
    │                                             │
    │      WHOSE PREFERENCES TO SHARE? ── 194     │
    │            SELECT...                        │
    │                                             │
    │      HOW OFTEN?        1 WEEK ── 196        │
    │                                             │
    │                                             │
    │      HOW MUCH DETAIL? ── 198                │
    │            SUMMARY                          │
    │            SELECTED                         │
    │            ALL                              │
    │                                             │
    └─────────────────────────────────────────────┘
```

U.S. PATENT DOCUMENTS

| | | |
|---|---|---|
| 6,020,883 A | 2/2000 | Herz et al. |
| 6,088,722 A | 7/2000 | Herz et al. |
| 6,298,482 B1 | 10/2001 | Seidman et al. |
| 6,389,593 B1 | 5/2002 | Yamagishi |
| 6,457,010 B1 | 9/2002 | Eldering et al. |

FOREIGN PATENT DOCUMENTS

| | | |
|---|---|---|
| WO | WO 97/49242 | 12/1997 |

* cited by examiner

*246*

SELECT PREFERENCES FOR GUIDE

MOM
MOM/JANE
MOM/ALICE

DAD                    *248*
DAD/TOM

TODD
TODD/KENDRA
TODD/MYSTERY PEOPLE

BETH
BETH/ROMANCE LOVERS

*FIG. 16*

METHOD AND APPARATUS FOR SHARING VIEWING PREFERENCES

CROSS-REFERENCE TO RELATED APPLICATIONS

This application claims the benefit of U.S. Provisional Patent Application Ser. No. 09/535,638, filed Mar. 24, 2000 now U.S. Pat. No. 6,813,775, by Craig A. Finseth, et al., and entitled METHOD AND APPARATUS FOR SHARING VIEWING PREFERENCES, which in turn claims priority from U.S Provisional patent application No. 60/126,572, filed on Mar. 29, 1999, the contents of all of which are incorporated herein by reference.

BACKGROUND OF THE INVENTION

1. Field of the Invention

The present invention relates to systems and methods for presenting media programs to subscribing viewers, and in particular to a system and method for sharing viewer preferences among viewers.

2. Description of the Related Art

The present invention relates to the provision of television content and advertising. Television programs are distributed to viewers by a variety of broadcasting methods. These methods include traditional analog broadcast television (National Television Systems Committee or "NTSC" standard), the upcoming digital broadcast television (Advanced Television Systems Committee or "ATSC" standard), cable television (both analog and digital), satellite broadcasting (both analog and digital), as well as other methods. These methods allow channels of television content to be multiplexed and transmitted over a common transmission medium.

Channel numbers are typically used to identify the stream of television content offered by a content provider. Program guide information is typically transmitted along with the television content, and typically also includes schedule information for display on users' televisions. The schedule information informs users what television programs are currently on, and what television programs will be shown in the near future.

It would be desirable in a television broadcast system to have receiving devices maintain viewer preference profiles by tracking the viewing history of users. It would also be desirable to have receiving devices communicate with each other and exchange viewer preference profiles. It would also be desirable to have groups of receiving devices communicating and exchanging group viewer preferences. In current television broadcast systems, users cannot conveniently share their viewing experience with their friends, relatives, or other individuals with similar interests. In current television broadcast systems there is also no convenient way for a user to affect the program guide content, advertising or conditional channel content of another user.

SUMMARY OF THE INVENTION

The present invention is a method and apparatus for sharing viewer preferences. The apparatus includes a transmission station and a plurality of receiver stations. The transmission station creates program guide data and advertising data that is in an "object" format. The transmission station combines the program guide and advertising objects with digital audio and video television signals, and transmits an output stream to the plurality of receiver stations. Each of the plurality of receiver stations receives the transmitted output stream and identifies the electronic program guide objects and advertising objects within the output stream. Each of the plurality of receiver stations stores the identified electronic program guide and advertising objects.

In the present invention, each of the plurality of receiver stations maintains viewing preference profiles, which comprise viewing preference information, by tracking the viewing history of each user. Receiver stations communicate with each other and exchange viewing preference information. Receiver stations store the received viewing preference information from another user, and use the received viewing preference information to display user specific program guide content, advertising, and conditional channel content.

Also in the present invention, receiver stations communicate viewing preference information to one or more servers, which combine the received viewing preference information into group viewing preference information. A server in turn communicates the group viewing preference information back to the receiver stations. Receiver stations receive and store the group viewing preference information, and use the received group viewing preference information to display group specific program guide content, advertising, and conditional channel content.

In summary, the present invention discloses a method, apparatus, and article of manufacture for sharing viewer preference information between a first user and a second user. The method comprises the steps of storing first user viewer preference information characterizing media programs selected by the first user in a memory of a first user device, and transmitting at least a portion of the first viewer preference information to a second user for storage in a memory of a second user device. The article of manufacture comprises a data storage device tangibly embodying instructions to perform these method steps.

The apparatus comprises a first user device which includes at least one receiver for receiving media programs and second user viewer preferences, a processor, a memory for storing viewer preference information characterizing the media programs selected by the first user, and a transmitter, for transmitting viewer preferences information to a second user device.

BRIEF DESCRIPTION OF THE DRAWINGS

Referring now to the drawings in which like reference numbers represent corresponding parts throughout:

FIG. 16 is a diagram showing an example of a screen for selecting a preference sub-history table to form the basis for constructing program guide content.

DETAILED DESCRIPTION OF THE PREFERRED EMBODIMENT

In the following description, reference is made to the accompanying drawings which form a part hereof, and which is shown, by way of illustration, several embodiments of the present invention. It is understood that other embodiments may be utilized and structural changes may be made without departing from the scope of the present invention.

Transmission of Television Content, Program Guide Data and Advertising Data

Figure 1:
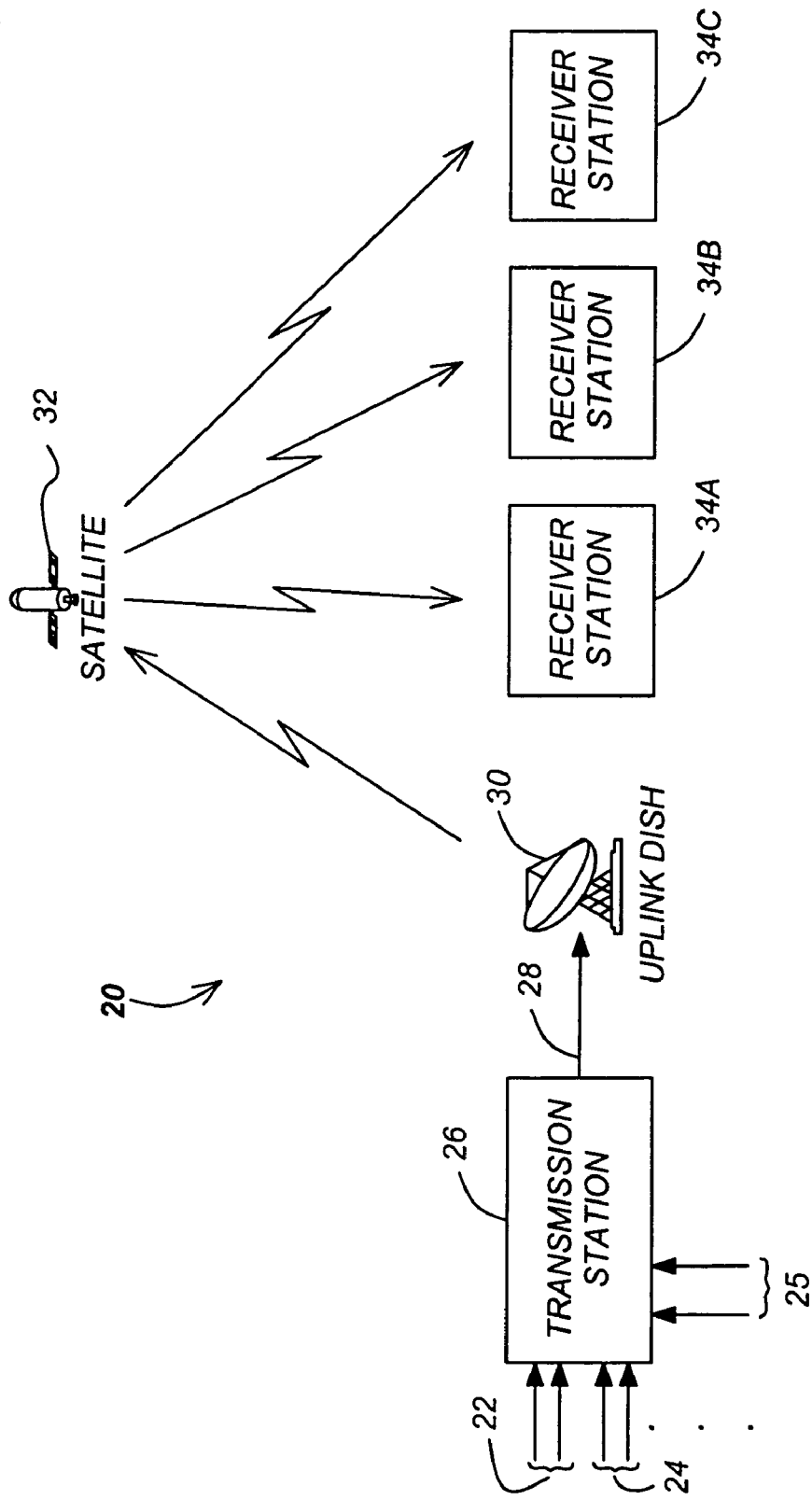
FIG. 1 is a block diagram of a preferred embodiment of a television broadcasting system for the transmission, receipt and display of television content and electronic program guide data.

FIG. 1 is a block diagram of television broadcasting system 20, which transmits and receives audio, video and data signals via satellite. Although the present invention is described in the context of a satellite-based television broadcasting system, the techniques described herein are equally applicable to other methods of television content delivery, such as over-the-air systems and cable-based systems.

The television broadcasting system 20 includes transmission station 26, uplink dish 30, satellite 32, and receiver stations 34A-34C (collectively referred to as receiver stations 34). Transmission station 26 includes a plurality of input lines 22 for receiving various signals, such as analog television signals, digital television signals, video tape signals, original programming signals, and computer generated signals containing hyptertext markup language (HTML) content and digital video server signals. Each input line 22 typically corresponds to a single television channel. Transmission station 26 also includes a plurality of schedule feeds 24 and advertising feeds 25. Schedule feeds 24 provide electronic schedule information about the timing and content of various television channels, such as that found in television schedules contained in newspapers and television guides. Advertising feeds 25 provide advertising data and information about the content of individual advertisements. The electronic schedule information from schedule feeds 24 is converted into program guide data by transmission station 26. Similarly, information from advertising feeds 25 is converted into advertising data by transmission station 26.

Transmission station 26 receives and processes the various input signals received on input lines 22, advertising feeds 25 and schedule feeds 24, converts the received signals into a standard form, combines the standard signals into a single output data stream 28, and continuously sends output data stream 28 to uplink dish 30. Output data stream 28 is preferably a modulated signal, which is modulated by transmission station 26 using standard frequency and polarization modulation techniques. In a preferred embodiment, output data stream 28 is a multiplexed signal including 16 frequency bands. Transmission station 26 is described in further detail below with respect to FIG. 2.

Uplink dish 30 continuously receives output data stream 28 from transmission station 26, amplifies the received signal, and transmits the signal to the satellite 32. Although a single uplink dish and satellite are shown in FIG. 2, multiple dishes and satellites are preferably used to provide additional bandwidth, and to help ensure continuous delivery of signals.

Satellite 32 revolves in geosynchronous orbit about the earth. Satellite 32 includes a plurality of transponders that receive signals transmitted by uplink dish 30, amplify the received signals, frequency shift the received signals to higher frequency bands, and then transmit the amplified, frequency shifted signals back to receiver stations 34. A total of 32 transponders are preferably used in the present invention.

Receiver stations 34 receive and process the signals transmitted by satellite 32. Receiver stations 34 include hardware and software for separating the electronic program guide data and advertising data from the received signals, and processing both the electronic program guide data and the advertising data. Receiver stations 34 are described in further detail below with respect to FIG. 3.

Figure 2:
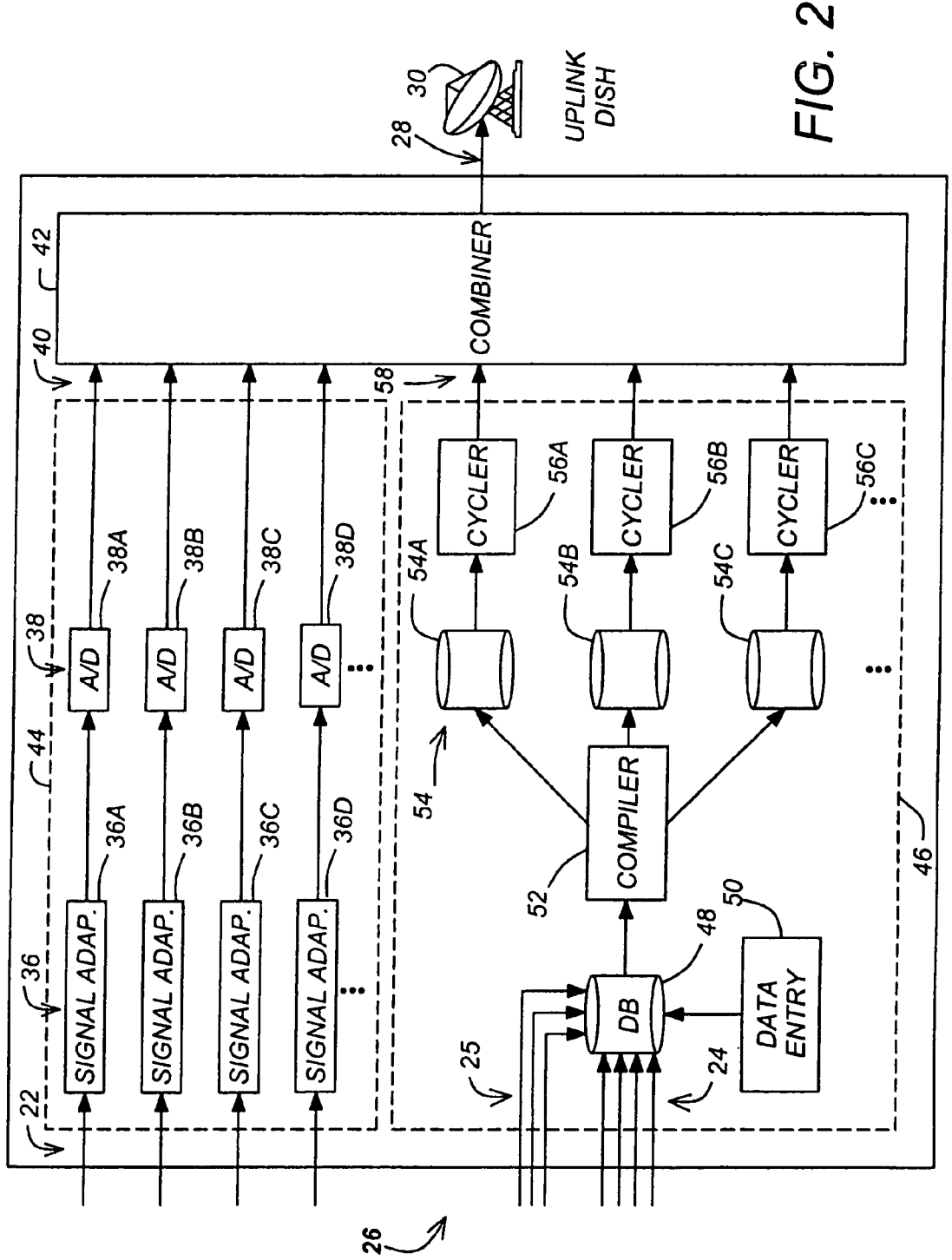
FIG. 2 is a block diagram of the transmission station of the system shown in FIG. 1.

FIG. 2 is a block diagram of transmission station 26. Transmission station 26 includes program transmitting system 44 and advertisement and program guide transmitting system 46.

Program transmitting system 44 includes input signal adapters 36A-36D (collectively referred to as input signal adapters 36), analog to digital (A/D) converters 38A-38D (collectively referred to as A/D converters 38), and combiner 42. Input signal adapters 36 are coupled to A/D converters 38, and A/D converters 38 are coupled to combiner 42. Although four input signal adapters 36 and four A/D converters 38 are shown in FIG. 2, several more will typically be used in commercial systems.

Input signal adapters 36 receive input signals from input lines 22, and convert the input signals to a standard form. As mentioned above, signals from input lines 22 include any combination of analog television signals, digital television signals, video tape signals, original programming signals, computer generated signals containing HTML content, digital video server signals, and digital or analog signals having audio content. Also, input lines 22 can receive signals from digital video servers having hard discs or other digital storage media. Input signal adapters 36 preferably convert the input signals to a high quality analog format. The high quality analog signals are output by input signal adapters 36 to A/D converters 38. A/D converters 38 convert the analog signals received from input signal adapters 36 to digital signals, and compress the digital signals using MPEG2 encoding, although other compression schemes may be used.

During the MPEG2 encoding step, A/D converters 38 also perform a statistical multiplexing operation. During the statistical multiplexing operation, A/D converters 38 determine the amount of bandwidth that each channel will use. The amount of bandwidth allowed for each channel is determined based upon the content of the signal on that channel, and the amount of bandwidth used by other channels. For a program such as the motion picture, "Independence Day", which has a very dynamic picture content with a great deal of movement and numerous bright explosions, the signal can not be compressed as much as a more static video signal like an information channel. The greater the dynamic content of the signal, the less it can be compressed and the greater the bandwidth required.

Typically, 30 Megabits of data per second are transmitted by uplink dish 30 for each transponder in satellite 32. Each transponder receives and transmits data for about six channels. Thus, each channel occupies approximately 5 Megabits of data per second, on average. During the statistical multiplexing operation, the amount of compression for each channel, and correspondingly the amount of information transmitted for each channel, is adjusted up or down depending upon the amount of available space for each transponder. Combiner 42 feeds back information to A/D converters 38 during the statistical multiplexing operation, informing A/D converters 38 of the amount of bandwidth used by various channels. A/D converters 38 then adjust the amount of compression of a signal based on the information fed back from combiner 42. The MPEG2 encoded digital data are output by A/D converters 38 to combiner 42. Combiner 42 groups the MPEG2 encoded digital data from each A/D converter 38 into a plurality of packets, with each such packet marked with a service channel identification (SCID) number. The SCIDs are later used by receiver 64 (shown in FIG. 3) to identify the packets that correspond to each television channel. Combiner 42 combines all of the packets for all of the channels, adds error correction data, and outputs a single output data stream 28 to uplink dish 30.

Program transmitting system 44 processes audio signals in the same manner as video signals, and combiner 42 combines digital audio signals with the digital video signals. Combiner 42 also receives advertising and electronic program guide data from input lines 58 (as described below with respect to the advertisement and program guide transmitting system 46) and adds that data to output data stream 28. The assembly and processing of the electronic program guide data prior to it being sent to combiner 42 is described in more detail below.

Output data stream 28, which is output by combiner 42, is a multiplexed signal that is modulated by combiner 42 using standard frequency and polarization modulation techniques. Output data stream 28 preferably includes 16 frequency bands, with each frequency band being either left polarized or right polarized. Since there are 32 transponders in the preferred embodiment, each of the 16 frequency bands are shared by two transponders. Therefore, transponder 1 is assigned frequency 1, left polarization; transponder 2 is assigned frequency 1, right polarization; transponder 3 is assigned frequency 2, left polarization, etc.

Also shown in FIG. 2 is a block diagram of advertisement and program guide transmitting system 46, which is a part of transmission station 26. Advertising and program guide data transmitting system 46 includes database 48, compiler 52, sub-databases 54A-54C (collectively referred to as sub-databases 54) and cyclers 56A-56C (collectively referred to as cyclers 56).

Schedule feeds 24 provide electronic schedule information about the timing and content of various television channels, such as that found in television schedules contained in newspapers and television guides. Schedule feeds 24 also provide HTML content. Advertising feeds 25 provide information describing various advertisements and provide the content for individual advertisements.

Database 48 is a computer-based system that receives data from schedule feeds 24 and advertising feeds 25 and organizes data into a standard format. Program guide data and HTML data may also be manually entered into program guide database 48 through data entry station 50. HTML data can be created with commercially available authoring applications, including those available from the CLARIS, MICROSOFT, and ADOBE corporations. Compiler 52 reads the standard form data out of database 48, converts the data into the proper format for transmission to users (specifically, the data is converted into program guide and HTML objects as discussed below) and outputs the data to one or more of sub-databases 54.

The program guide, advertising, and HTML objects are temporarily stored in sub-databases 54 until cyclers 56 request the information. Each of cyclers 56 preferably transmits objects to combiner 42 at a: different rate than the other cyclers 56. For example, cycler 56A may transmit objects to combiner 42 every second, while cyclers 56B and 56C may transmit objects every 5 seconds and every 10 seconds, respectively.

Since receiver 64 (shown in FIG. 3) may not always be on and receiving and saving (e.g. program guide) objects, the objects must be re-transmitted often. Program guide objects for programs that will be shown in the next couple of hours are sent more frequently than program guide objects for programs that will be shown in 12 hours or more. Thus, the program guide objects for the most current programs are sent to a cycler 56 with a high rate of transmission, while program guide objects for later programs are sent to cyclers 56 with a lower rate of transmission.

All of the objects output by the plurality of cyclers 56 are combined by combiner 42. Combiner 42 combines the objects with the digital video and audio data output by A/D converters 38 on output lines 40. Combiner 42 transmits output data stream 28, which includes the advertising data, the program guide data, HTML data and the digital video and audio data, to uplink dish 30.

Format of Transmitted Program Guide and Advertising Data

Before transmitting data to sub-databases 54, compiler 52 organizes the program guide and advertising data from database 48 into objects. Each object preferably includes an object header and an object body. The object header identifies the object type, object ID and version number of the object. The object type identifies the type of the object. The various types of objects are discussed below. The object ID uniquely identifies the particular object from other objects of the same type. The version number of an object uniquely identifies the object from other objects of the same type and object ID. The object body includes data for constructing a portion of a program guide or an advertisement that is ultimately displayed on a user's television.

Before transmission, each object is preferably broken down by compiler 52 into multiple frames. Each frame is made up of a plurality of 126 byte packets. Each frame includes a frame header, program guide data or advertising data and a checksum. Each frame header includes the same information as the object header described above—object type, object ID and version number. The frame header uniquely identifies the frame, and its position within a group of frames that make up an object. The checksum is examined by receiver 64 to verify the accuracy of the data within received frames.

The present invention uses over 15 different object types. The objects that are used for providing channel definition parameters include boot objects, channel list objects, channel objects and conditional objects. Advertising objects provide the characteristics of advertisements and point to other objects that contain the content of the advertisements. Other objects, such as HTML objects, are used to provide channel and advertisement content. Still further objects, such as general program objects, general schedule objects and master schedule objects are used by receiver 64 to generate a display of a program guide on a user's television.

A boot object identifies the SCIDs where all other objects can be found. A boot object is always transmitted on the same channel, which means that each packet of data that makes up a boot object is marked with the same SCID number. Boot objects are transmitted frequently to ensure that receivers 64 that have been shut off, and are then turned back on, immediately receive information indicating the location of the various program guide objects. Thus, boot objects are sent from compiler 52 to a cycler 56 with a high rate of transmission.

Receiving and Processing Program Data Guide Data and Advertising Data

Figure 3:
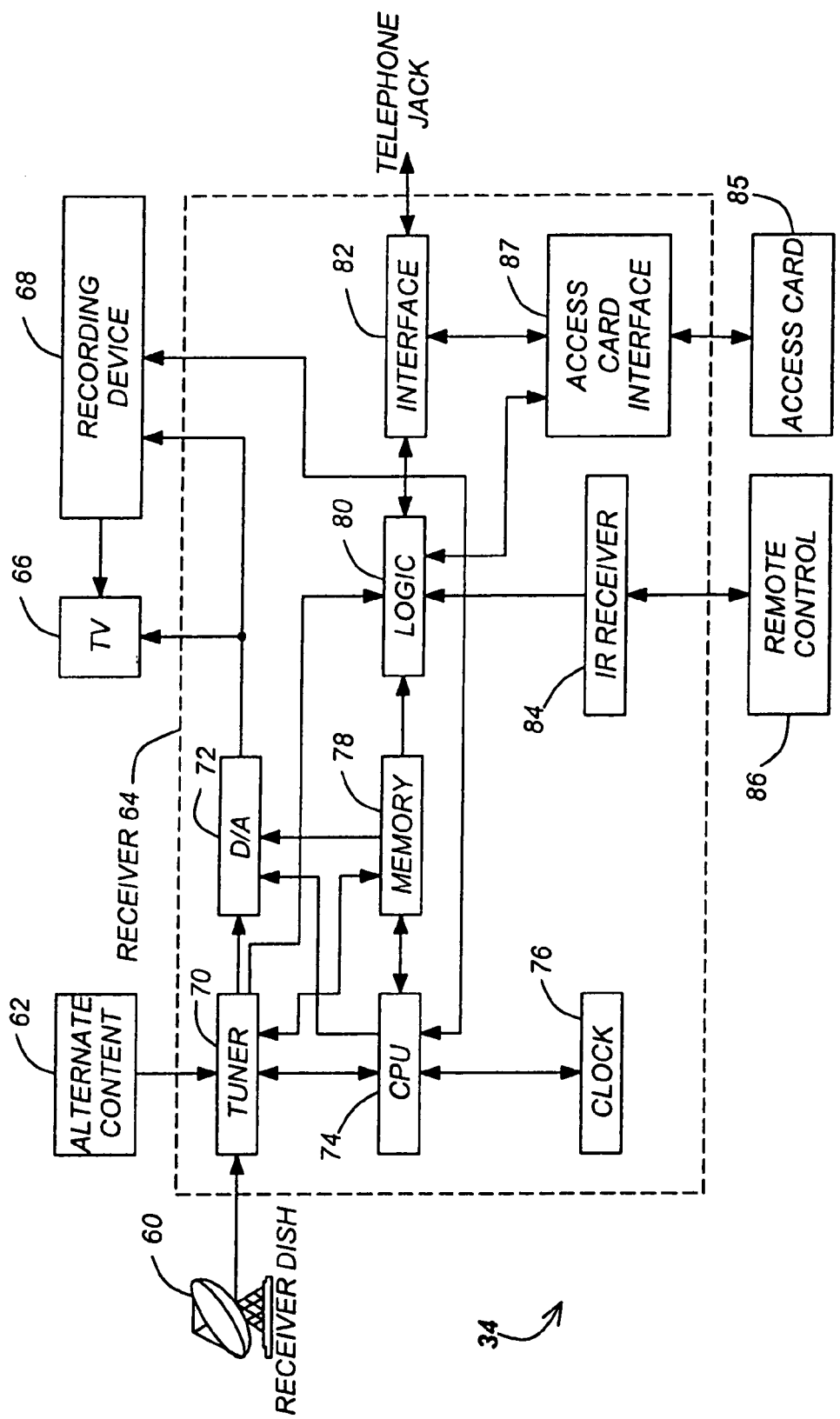
FIG. 3 is a block diagram of a receiver station for receiving and decoding audio, video, and data signals.

FIG. 3 is a block diagram of one of receiver stations 34, which receives and decodes audio, video, and data signals. Receiver station 34 includes receiver dish 60, alternate content source 62, receiver 64, television 66, recording device 68, a remote control 86, and an access card 85 communicatively coupled to the receiver 64 by an access card interface 87. Receiver 64 includes tuner 70, digital-to-analog (D/A) converter 72, CPU 74, clock 76, memory 78, logic circuit 80, interface 82, and infrared (IR) receiver 84.

Receiver dish 60 receives signals sent by satellite 32, amplifies the signals, and passes the signals on to tuner 70. Tuner 70 operates under control of CPU 74. Tuner 70 is preferably two separate tuners, a first tuner for tuning to digital and advanced television systems committee (ATSC) channels, and a second tuner for tuning to analog national television standards committee (NTSC) channels. The functions performed by CPU 74 are controlled by a control program stored in memory 78. Memory 78 also stores a parameter table which includes a variety of parameters for receiver 64 such as a list of channels receiver 64 is authorized to process and generate displays for, the zip code and area code for the area in which receiver 64 is used, and the model number of receiver 64. Clock 76 provides the current local time to CPU 74. Interface 82 is preferably coupled to a telephone jack at the site of receiver station 34. Interface 82 allows receiver 64 to communicate with transmission station 26 and other receiver stations 34 via telephone lines. Interface 82 may also be used to transfer data to and from a network, such as the Internet.

The signals sent from receiver dish 60 to timer 70 are digital signals that are grouped into a plurality of packets. Each packet includes a header that identifies the SCID number for the packet, and the type of data contained in the packet (e.g., audio data, video data, advertising data, or program guide data). Tuner 70 includes multiple output lines for transmitting video data, audio data, advertising data and program guide data. As packets are received from receiver dish 60, tuner 70 identifies the type of each packet and outputs each packet on the appropriate output line. If tuner 70 identifies a packet as program guide data or advertising data, tuner 70 outputs the packet to memory 78. Advertising data is stored in an advertising database in memory 78. Program guide data is stored in a guide database in memory 78.

In addition to the digital satellite signals received by receiver dish 60, other sources of television content are also preferably used. For example, alternate content source 62 provides additional television content to television 66. Alternate content source 62 is coupled to tuner 70. Alternate content source 62 can be an antenna for receiving off-the-air signals, NTSC signals, a cable for receiving ATSC signals, or other content source. Although only one alternate content source 62 is shown, multiple sources can be used.

Initially, as data enters receiver 64, tuner 70 looks for a boot object. Boot objects are always transmitted with the same SCID, so tuner 70 knows that it must look for packets marked with that SCID. A boot object identifies the SCIDs where all other objects can be found. The information from the boot object is used by tuner 70 to identify packets of advertising data and program guide data and route them to memory 78.

As program guide data and advertising data are received and stored in the database in memory 78, CPU 74 performs various operations on the data in preparation for displaying a program guide or an advertisement on television 66. These operations include packet assembly, object assembly, and object processing.

The first operation performed on the advertising and program guide data stored in the guide database in memory 78 is packet assembly. During the packet assembly operation, CPU 74 examines the stored advertising and program guide data and determines the locations of the packet boundaries.

The next step performed by CPU 74 is object assembly. During the object assembly step, CPU 74 combines packets to create object frames, and then combines the object frames to create program guide and advertising objects. CPU 74 examines the checksum transmitted within each object frame, and verifies whether the frame data was accurately received. If the object frame was not accurately received, it is discarded from memory 78. In addition, during the object assembly step, receiver 64 discards assembled objects that are of an object type that the receiver 64 does not recognize. Receiver 64 maintains a list of known object types in memory 78. CPU 74 examines the object header of each received object to determine the object type. CPU 74 compares the object type of each received object to the list of known object types stored in memory 78. If the object type of an object is not found in the list of known object types, the object is discarded from memory 78.

The last step performed by CPU 74 on received program guide and advertising data is object processing. During the object processing step, the objects stored in the database are combined to create a digital image of a program guide. The objects stored in the database are organized to create a digital image of the advertisement. The digital image of the program guide or advertisement is later converted to an analog signal that is sent to television 66 for display to a user.

Using instructions stored in the memory 78, the CPU 74 implements instructions which can be used to practice the invention as described herein. In addition to the memory 78, such instructions can be tangibly embodied in a computer-readable medium, e.g., data storage device, which could include one or more fixed or removable data storage devices, such as a zip drive, floppy disc drive, hard drive, CD-ROM drive, tape drive, etc. thereby making a computer program product or article of manufacture according to the invention. Further, such instructions may be transmitted on a signal via downlink or by telephone or the Internet. As such, the terms "article of manufacture," "program storage device" and "computer program product" as used herein are intended to encompass a computer program accessible from any computer readable device or media.

Using an Electronic Program Guide

Users select a particular channel to watch on television 66 using remote control 86. Remote control 86 emits infrared signals that are received by infrared (IR) receiver 84 in receiver 64. Other types of data entry devices may alternatively be used, such as an ultra-high frequency (UHF) remote control, a keypad on receiver 64, a remote keyboard, and a remote mouse. Channels are preferably selected using remote control 86 to navigate around an electronic television program guide, such as program guide 88A shown in FIG. 4, which is generated by receiver 64 and displayed on television 66. Channels may also be selected by entering a channel number with remote control 86.

Program guide 88A is displayed on a television, and provides information about the timing and content of various television programs. Program guide 88A may alternatively be displayed on other types of display devices, such as on a liquid crystal display (LCD) panel.

Program guide 88A includes grid 90, cells 92, channel list 94, scroll buttons 96A and 96B, time indicators 98A-98C (collectively referred to as time indicators 98), jump button 100, time button 102, day indicators 104, information window 106, and category buttons 108A, 108B and 108C (collectively referred to as category buttons 108). The various buttons and cells are highlighted by navigating around program guide 88A using remote control 86.

Figure 4:
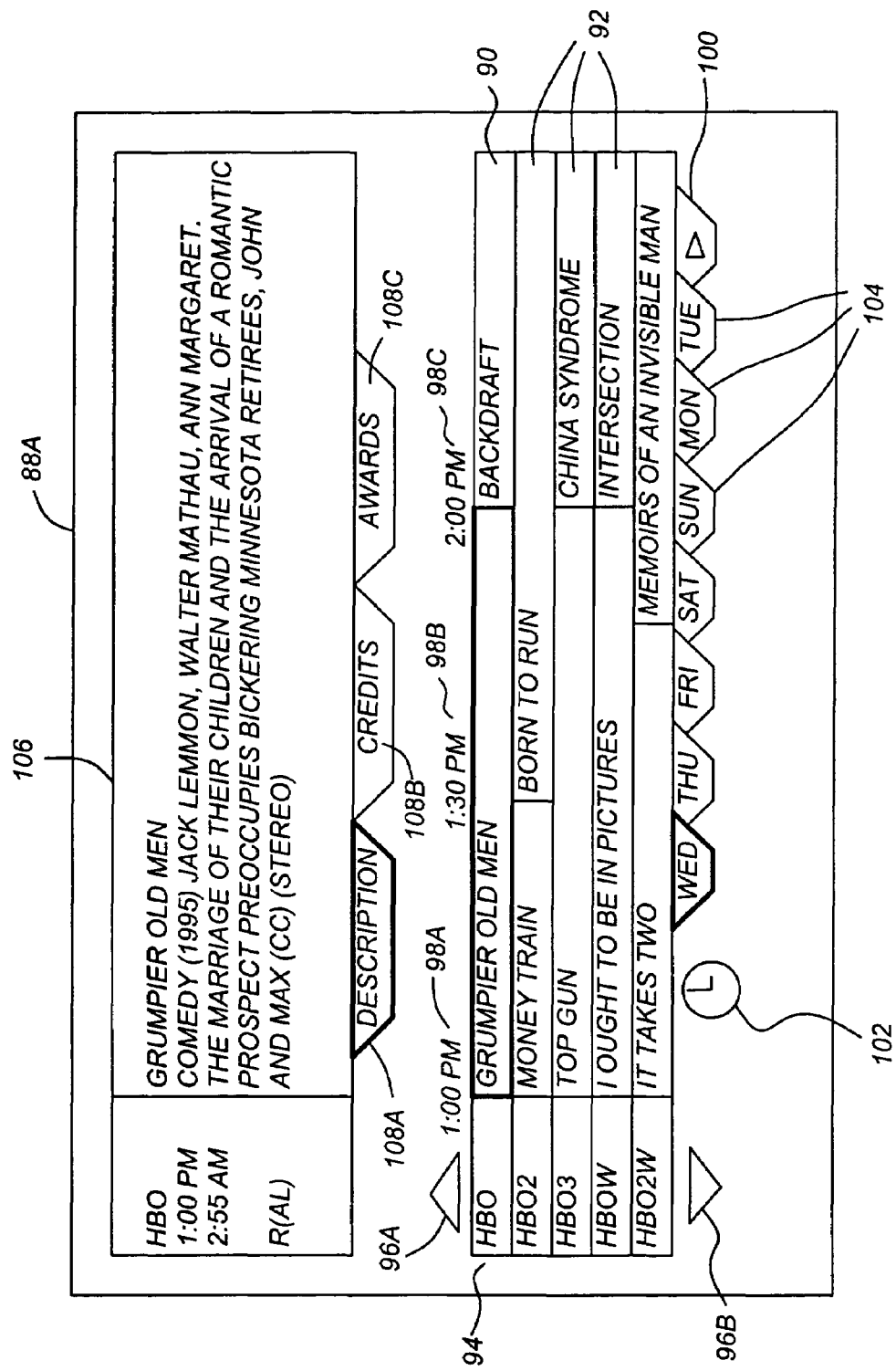
FIG. 4 is a diagram of a preferred embodiment of an electronic television program guide.

Grid 90 consists of a plurality of cells 92. Each cell 92 includes a program title, and may provide additional information. Channel list 94 includes a list of channel names or channel numbers, or both. Channel list 94 may also include icons, such as icons that represent particular channels. The names and channel numbers for each entry in channel list 94 are obtained from the channel object for that entry. Time indicators 98A, 98B and 98C (referred to collectively as "time indicators 98 ") indicate start and end times of the various programs displayed in grid 90. Although half-hour time blocks (a time block is the length of time between two time indicators 98) are shown in program guide 88A, other time block lengths may be used. Scroll buttons 96A and 96B allow users to scroll up and down channel list 94 and display different channels. Day indicators 104 indicate the day for which program information is presently being displayed. In FIG. 4, day indicators 104 indicate that the displayed guide information is for Wednesday. Jump button 100 allows users to skip to program information for a different day than that presently displayed. Time button 102 allows users to skip to program information for a different time than that presently displayed.

Information window 106 provides additional information about programs displayed in grid 90. The type of information displayed window 106 depends on which category button 108A-108C is currently selected. Users select one of category buttons 108A-108C using remote control 86. As shown in FIG. 4, the "Description" category 108A is selected. Therefore, when a particular program is selected from grid 90 by remote control 86, that program is displayed in information window 106. In FIG. 4, the program "Grumpier Old Men" was selected from grid 90, so a description of that program is displayed in information window 106. Similarly, if category 108C were selected, credits information or awards information, respectively, for "Grumpier Old Men" would be displayed in information window 106. Other types of category buttons 108 may also be used to display additional categories of information.

Program guide 88A preferably includes schedule information for numerous channels, including digital satellite TV (DSAT) channels, ATSC channels and NTSC channels, regardless of whether the channel content is actually transmitted by television broadcasting system 20. Program guide 88A preferably includes schedule information for the television content generated by alternate channel source(s) 62.

Maintaining Viewer Preference Profiles

According to the present invention, receiver 64 compiles information about a user's viewing preference profile. This can be accomplished by accepting viewer preference information directly from the user, or by monitoring and storing viewer-selected media programs.

Receiver 64 preferably tracks a user's viewing history and stores viewing preference information in a selection history table in memory 78. The selection history table is initially empty when receiver 64 is first purchased. For each media program that is chosen by a user, receiver 64 stores information characterizing the media program. The characterizing information is included in the program guide objects broadcast to the receiver as discussed above. When a user selects a television program from program guide 88A, the characterizing information from the associated program guide object is stored in the selection history table in memory 78.

The characterizing information is preferably organized into attributes. Attributes include information such as category descriptors that identify the type and category of television program, name descriptors that identify the name of the program selected, credits information that identify the names and roles of those involved in the production of the program, and key words and phrases in the description of the program. Category descriptors preferably provide a two-tiered category classification, such as "sports/baseball" or "movie/drama," although any number of tiers may be used including single tiers.

Attributes also include indicators that the television program is one of a particular series or that the program is one of a group of associated programs. For example, each episode of "Star Trek, The Next Generation" preferably has the same series indicator. The "Star Trek" movies, and various "Star Trek" series preferably all have the same group indicator, even if they are not part of one particular series. CPU 74 keeps track of the television program selections made by users, and stores the attributes for selected television programs history table and links the attributes to the current user.

In compiling a selection history table, receiver 64 preferably filters out television programs the user has selected, but viewed for an insignificant time period. CPU 74 of receiver 64 preferably keeps track of the amount of time each television program is watched using clock 76 and stores the times in the selection history table. If programs and channels are watched for a time more than a set threshold, twelve hours for example, the attributes for those channels are not stored in the selection history table. If programs are watched less than a set threshold, such as 30 seconds, the attributes for those programs are not stored in the selection history table. In this way, television programs the user selects when "channel surfing", or television programs displayed when the user has forgotten to turn off the receiver are filtered out of the selection history stored in memory 78.

Figure 5:
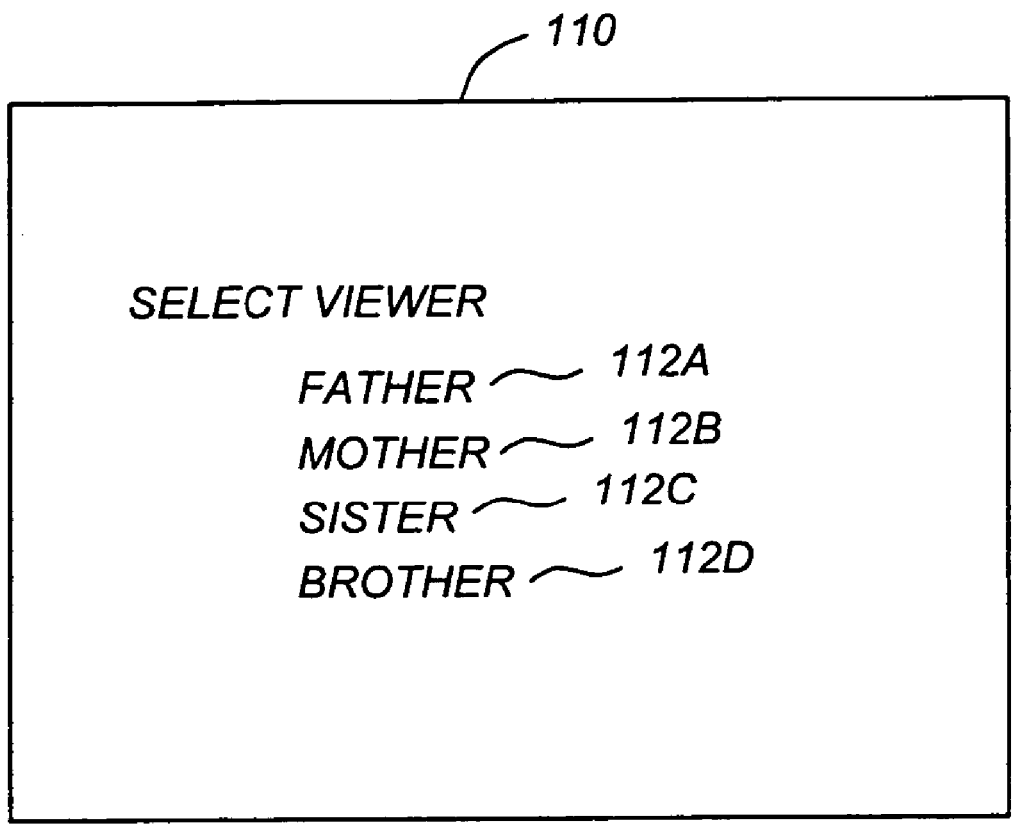
FIG. 5 is an example of a user identification screen.

In addition, in compiling a selection history table, receiver 64 preferably tracks a plurality of individual user's viewing preferences. When receiver 64 is first turned on, or after receiver 64 has not been interacted with for a predetermined time, receiver 64 prompts the user to identify himself or herself. FIG. 5 shows identification screen 110, which is one example of a screen the receiver 64 displays to prompt for the identification of the user(s). Identification screen 110 displays a set of descriptions 112A-112D which enables the user to identify himself or herself correctly. Although FIG. 5 shows descriptions 112A-112D as family roles, descriptions can be identification numbers, names, initials, or other identifying information. The user highlights and enters one of descriptions 112A-112D using remote control 86, thereby identifying himself or herself.

When a user enters one of descriptions 112A-112D with remote control 86, a user identification signal is sent to receiver 64. Receiver 64 receives the user identification signal, identifies the user and stores the attributes associated with that user's channel and television program selections in a user-specific sub-history within the selection history table. Receiver 64 uses the selections made by each of the plurality of identified users to create and update the list of attributes linked with that user.

Figure 6:
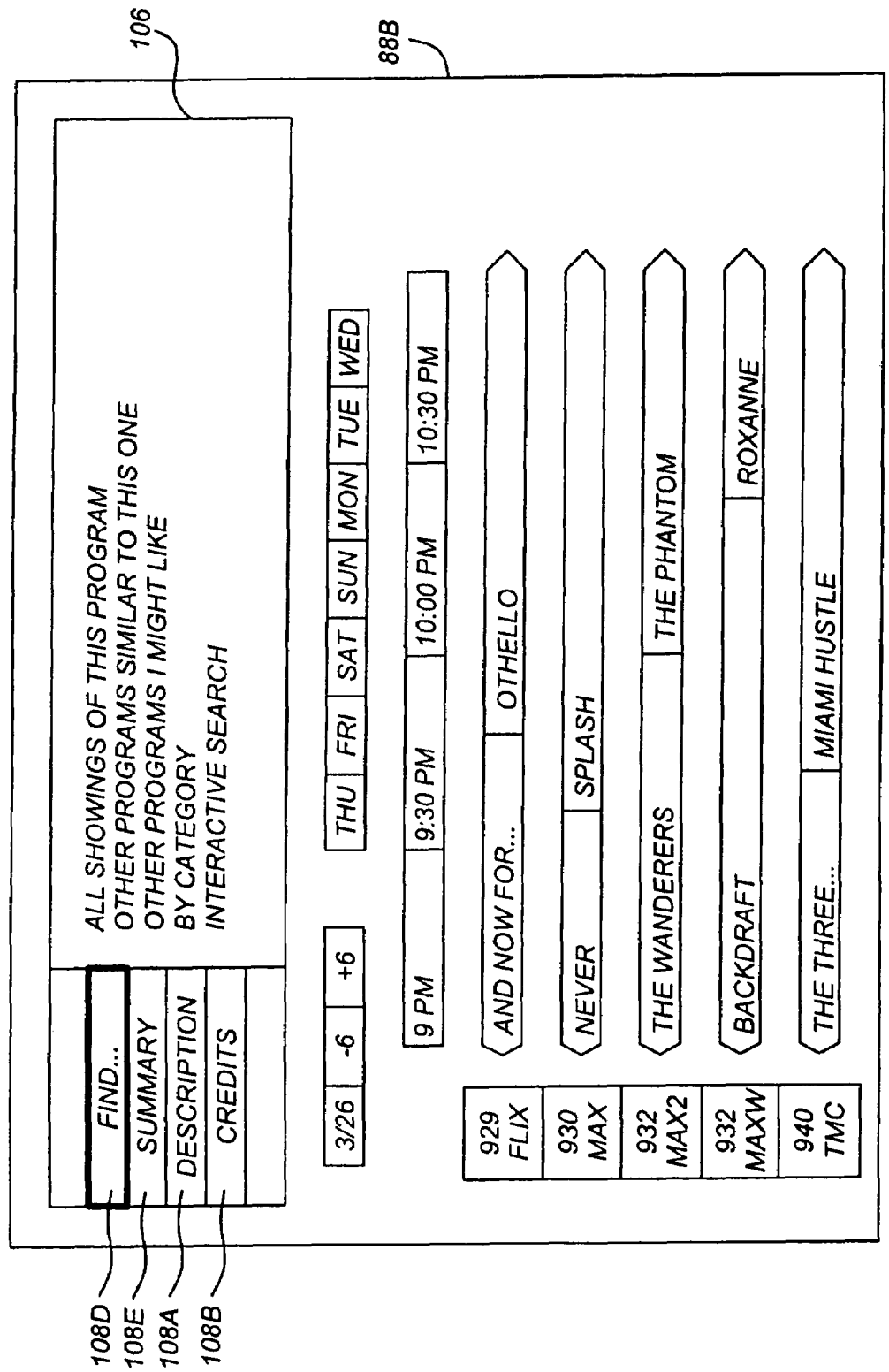
FIG. 6 is a diagram of a preferred embodiment of an electronic television program guide showing various searching options.

Viewing preference information can be used to provide user specific program guide content, advertising, and conditional channel content. FIG. 6 shows electronic television program guide 88B, which is generally similar to electronic television program guide 88A shown in FIG. 4, but includes additional category buttons 108E and 108D as well as other differences. Users can scroll up and do the plurality of category buttons 108 using remote control 86. In FIG. 6, a user has selected category button 108D ("Find"). Receiver 64 presents a user with a list of search options in information window 106. Using remote control 86, a user selects the "Other Programs I Might Like" search option from information window 106. In response, receiver 64 reviews the selection history table that is linked to the current user and compares the attributes contained therein to attributes of the program guide objects of other programs. Receiver 64 uses similarity matching techniques to determine how well certain television programs correlate to the viewing preference information in the user-specific sub-history of the selection history table. Receiver 64 identifies television programs with similar attributes and displays a list of those television programs in information window 106.

In a similar fashion, viewing preference information is used to provide flexible advertising techniques that target specific users of each receiver 64. Each advertisement comprises an advertising object that includes attributes associated with the advertisement and which points to other objects which contain content to assemble the advertisement for display. Receiver 64 determines how well a particular advertisement fits the individual user. Receiver 64 uses matching techniques to compare the attributes associated with the advertising object with the user's viewing preference information attributes from the user-specific sub-history table. Receiver 64 then determines which advertisements are assembled and displayed for the user, and when and how those advertisements are displayed to the user.

Viewing preference information can also be used to vary content. Certain channels can be defined to display different content to different users. Instead of defining a television channel as having the same content for all viewers, a television channel can be defined with conditional logic so the content can be varied from viewer to viewer. The conditional logic may point to the viewing preference information of a particular user. An example of such conditional logic is: "if this user likes to watch comedies starring Jack Lemmon, then show the conditional channel content." Receiver 64 then evaluates the conditional logic by comparing the user's viewing preference information comprising attributes stored in the user-specific sub-history, and displays the conditional channel content only if the user's viewing preference information reflects that the user likes comedies starring Jack Lemmon.

Sharing Viewer Preference Information

In addition to maintaining viewing preference information for each user of the receiver 64, a plurality of receivers 64 can allow users to share their viewing preference information. As described above, viewing preference information can be used to provide user specific program guide content, advertising and conditional channel content. Similarly, shared viewing preference information from another receiver 64 can also be used to specifically alter program guide content, advertising and conditional channel content.

Figure 7:
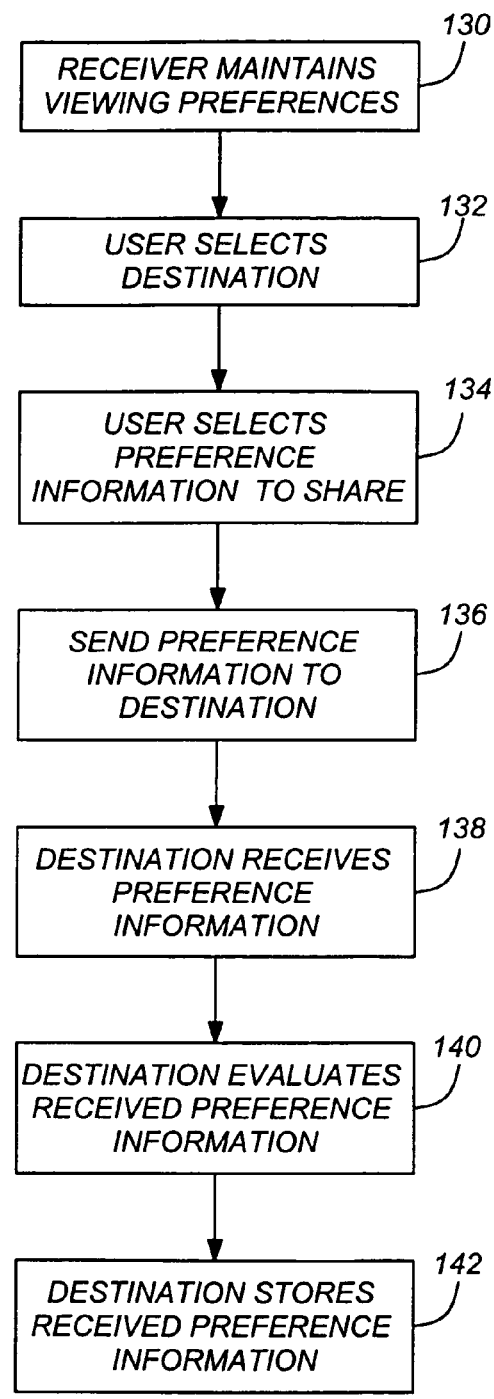
FIG. 7 is a flow diagram illustrating a preferred embodiment of the process of sharing viewing preference information.

FIG. 7 is a flow diagram illustrating the process of sharing viewing preference information. As described above, a first user device such as a receiver 64 compiles information about a first user's viewing preferences by storing, in a user-specific sub-history table, attributes of the television program viewed by a user (box 130). When the user wants to share viewing preference information, the user initiates the process using, for example, remote control 86. To share viewing preference information a user must first select with whom to share the information, which is represented by box 132. A user selects a destination/selected recipient, which includes a name and a telephone number or Internet address. A user must also select what information to share with the selected recipient, as represented by box 134. A user may choose to share the entire contents of his/her user-specific sub-history table with the selected recipient. A user may choose to tell the recipient only about a specific television program. Using remote control 86 (FIG. 3) or another input device such as an infrared keyboard, a user can also share specific comments or reviews regarding a television program. However, for privacy reasons, a user may wish to send only summary or depersonalized information regarding his or her viewing preferences where only certain attributes from his or her preference history are shared with others.

Receiver 64 then transmits at least a portion or a processed version of the selected viewing preference information to the selected recipient (e.g. second user) via telephone lines or the Internet, which is represented in box 136. Interface 82 (shown in FIG. 3) of receiver 64 includes a modem or Ethernet interface card, allowing receiver 64 to send the selected viewing preference information along either medium. A user can select to regularly share preference information by establishing a share interval as will be discussed in more detail below. The viewing preference information can be sent directly to the recipient, or through a third party, such as the broadcaster providing the media program. In this case, the broadcaster can act as a central depository for collecting, maintaining, securing and disseminating information regarding viewer preferences, and the viewer preferences can be transmitted to the desired recipients on using the satellite downlink. In one embodiment, the third party may filter the first user viewer preferences to generate a processed version of the viewer preferences. For example, the third party may depersonalize the first user's viewer preferences by removing identifying information, or may use the first user's viewer preferences to generate statistical viewer preferences based on demographic information.

A second user device such as the receiver 64 of the selected recipient at destination receiver station 34 receives preference information via interface 82, which is represented by box 138. CPU 74 of destination receiver station 34 evaluates the received viewing preference information based on security measures as represented by box 140. The security measures include each receiver 64 maintaining a list of recognizable sources that identifies from whom viewing preference information will be accepted. The security measures also specify the type of preference information that will be accepted. For instance, a user may select to accept only summary information or only specific attributes related to television programs. If receiver 64 at the destination accepts the received viewing preference information, then receiver 64 stores the preference information in the selection history table in memory 78 (FIG. 3), as is represented by box 142. The user designates whether the received viewing preference information of another individual is stored in a separate user-specific sub-history table or is merged into a single common preference history table.

Once stored, the shared viewing preference information can be used by a user to see what other users are recommending to watch or, by using similarity matching techniques as described above, to build a program guide that displays programs that other users would find interesting. The shared viewing preference information can also be used to provide advertising that targets a specific audience. The present invention allows users to conveniently communicate by electronically sharing their television viewing experience and to influence the viewing patterns of others.

Figure 8:
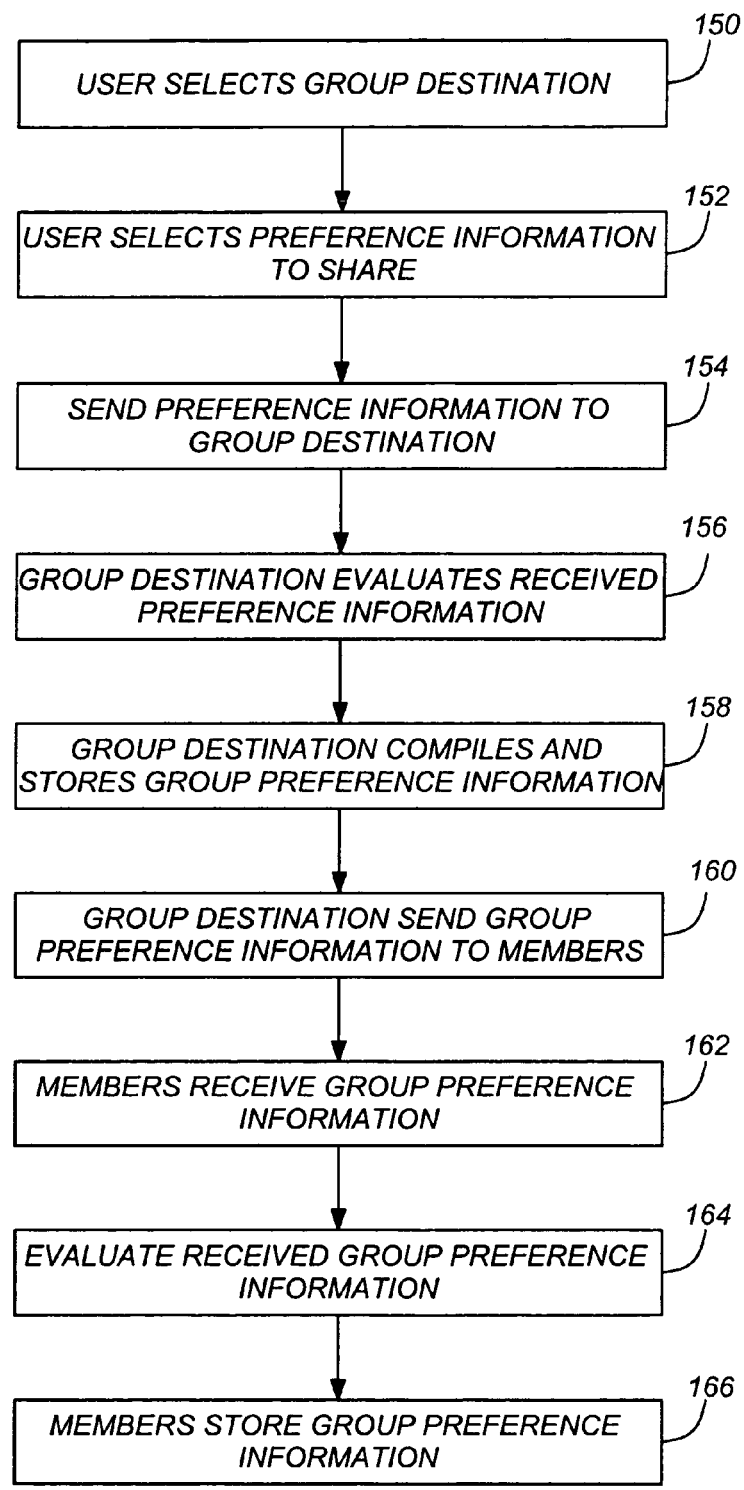
FIG. 8 is a flow diagram illustrating preferred embodiment of the process of sharing group viewing preference information.

According to the present invention, viewing preference information can be shared not only with other individual users, but can be shared amongst groups of users. FIG. 8 is a flow diagram that illustrates the process of sharing viewing preferences amongst a group of users.

When a user decides to share viewing preference information with a group, the user initiates a multi-step process. Using remote control 86, a user navigates through display screens generated by receiver 64 to set up the sharing process, which will be described in more detail below. Initially, a user selects a group with which to share viewing preference information, which is represented by box 150. Then a user selects what type of information to share with this group, as represented by box 152. A member of a group can select to share specific television program information including attached notes or comments, the entire contents of their respective selection history table, or summary preference information similarly to sharing viewing preference information with individual users.

Next, a user sends the selected preference information as represented by box 154. Receiver 64 uses interface 82 and sends the preference information via telephone lines or the Internet to the broadcast center (not pictured). The broadcast center includes a server which receives the incoming preference information from a plurality of users belonging to the group. Alternatively or in combination with the foregoing, designated receivers 64 can function as servers by including additional programming but without requiring additional hardware components. In the latter alternative, users share preference information with a designated member of the group, whose receiver 64 collects, combines and redistributes, via interface 82, the combined preference information to all members of the group.

After receiving viewing preference information from a plurality of users, the server evaluates the received preference information before combining it into a group viewing preference database, as represented by box 156. Due to the public accessibility of servers and the extent to which inappropriate information could damage the combined group viewing preference database, special care is taken to verify that the viewing preference information that is received by the server is legitimate information. Numerous techniques for establishing and evaluating security criteria to ascertain the legitimate nature of information is known in the art (including anti-virus programming) and can be used by the server to evaluate the received viewing preference information. The server discards received viewing preference information that it determines to be inappropriate, while legitimate information is stored in a group viewing preference database by the server, as represented by box 158. The server stores all of the incoming preference information and preferably organizes television program attributes based on frequency of user selection (i.e. television programs organized based on their popularity). If the amount of memory becomes an issue, then less frequently received program attributes are discarded to make room for ad preference information.

After a designated amount of time, the server sends the contents of a group viewing preference database to receivers 64 of each member of the group as represented by box 160. The server sends group viewing preference information to receivers 64 via satellite data stream 28 (shown in FIG. 2) along with guide data, advertising data and television program data, but can alternatively send the information via telephone lines or the Internet. The group viewing preference information has a unique identifier within satellite data stream 28 so that receivers 64 can identify the information and properly store it.

Appropriate receivers 64 receive the group viewing preference information, which is illustrated by box 162. If a server sends the group viewing preference information from the broadcast center via satellite data stream 28, then while each receiver 64 receives the data stream, only members of the group recognize the unique identifier of the group preference data. Only receivers 64 subscribing to the group retain the recognized group viewing preference data, while all remaining receivers 64 discard the incoming group preference data. If a server sends the group viewing preference information via telephone lines or the Internet, then only the specifically addressed receivers 64, of the group, receive the group preference information. Box 164 (like box 140 of FIG. 7) represents receiver 64 evaluating the incoming viewing preference information based on security criteria. If receiver 64 determines that the received preference information is acceptable based on the security measures described above, then receiver 64 stores the group viewing preference information in its memory (box 166).

Group viewing preference information can also be used to customize program guides, advertising, and television channel content. A program guide can use group viewing preference information to display television programs that might be interesting to a group of people with which a user is acquainted or simply shares common interests. A user can review received preference information to see specific recommendations of television programs or to review comments or notes regarding television programming. The sharing of viewing preference amongst individual users or groups allows users to share their television viewing experiences and to conduct virtual "water cooler" discussions about what they saw on television.

Figure 9:
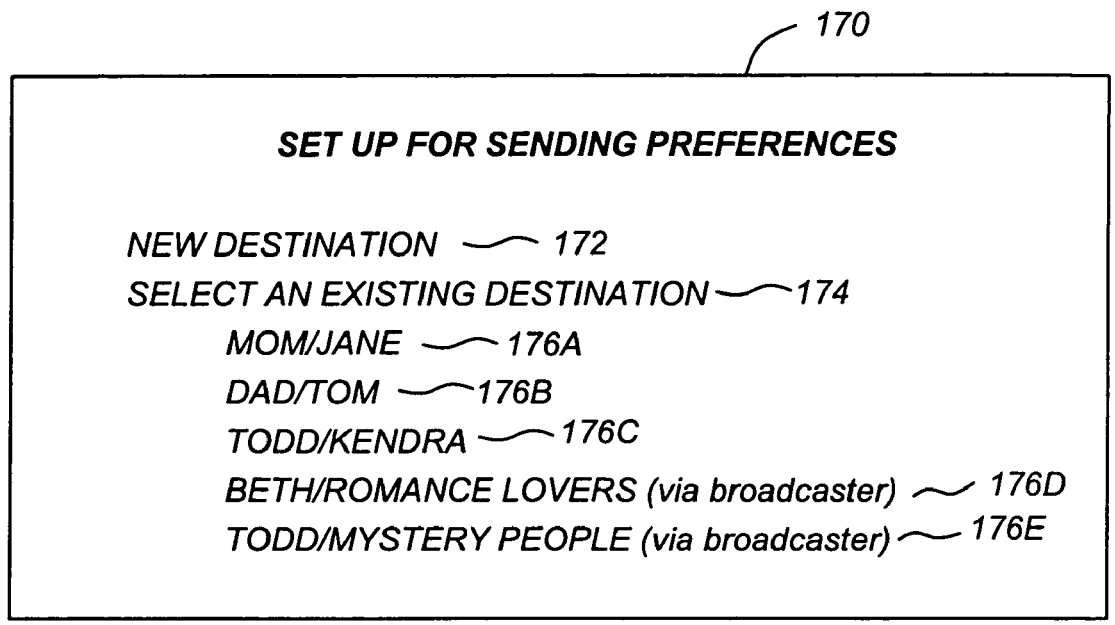
FIG. 9 is a diagram showing an example of an initial set-up screen.
Figure 10:
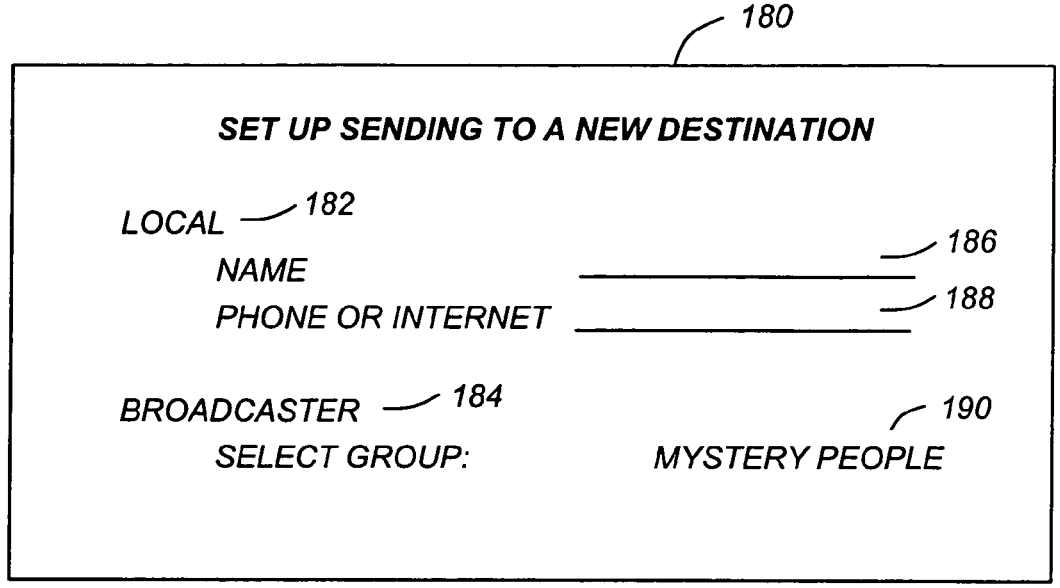
FIG. 10 is a diagram showing an example of a new destination identification screen.
Figure 11:
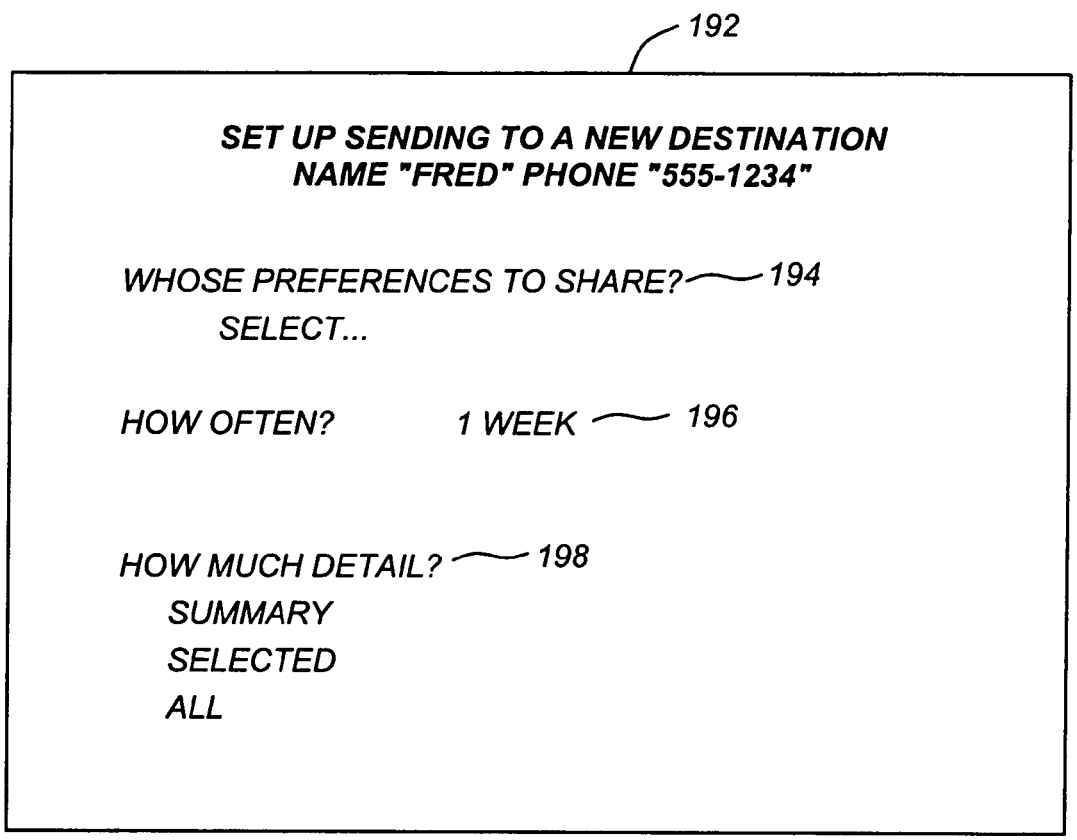
FIG. 11 is a diagram showing an example of a follow-on set-up screen.

FIGS. 9-11 illustrate examples of screens displayed to a user navigating through an interactive sending procedure of sharing viewing preference information. FIG. 9 shows an embodiment of an initial set-up screen 170 that is displayed to a user that has selected to send preference information to another user. Initial sending screen 170 includes option 172 to select a "New Destination" and option 174 to "Select an Existing Destination." "Select An Existing Destination" option 174 includes a list of existing destinations 176A-176E (collectively referred to as existing destinations 176). A user is presented the option of sending viewing preference information to an existing destination (option 174) or setting up a new destination (option 172). In the present example, existing destinations 176 include individual user destinations 176A-176C and group server destinations 176D-176E located at the broadcaster. If a user chooses to setup a new destination and selects option 172, then new destination identification screen 180 is displayed, as shown in FIG. 10. New destination identification screen 180 allows a user to select local destination 182 or broadcaster destination 184. A user designates an individual user as the new destination by selecting local destination 182. Local destination 182 preferably includes name input request 186 and telephone number or Internet address input request 188. A user enters a name and respective address of a particular user to define a new destination by using remote control 86 (FIG. 3) or other available input devices such as infrared keyboards. A user chooses to preference information with a group by selecting broadcaster destination. Broadcaster destination 184 includes a list of groups 190 from which the user selects a group. Upon selecting a new destination, a user preferably identifies the type of information to share with that destination.

FIG. 11 is an illustration of an example of follow-on screen 192, which is presented to a user after a user has defined a new destination by the name "Fred" at phone number "555-1234." Follow-on screen 192 includes "Whose Preference To Share?" category 194, "How Often?" category 196, and "How Much Detail?" category 198. Follow-on screen 192 allows a user to identify the type of viewing preference information to share with a destination and the time interval between sending viewing preference information to the same destination.

The "Whose Preference To Share?" category 194 allows a user to select a table from a list of user-specific sub-history tables, from which preference information will be sent. The "How Often?" category 196 allows a user to specify a sharing interval such as a day, a week, a month, etc. In the example illustrated in follow-on screen 192, a user has selected a one-week sharing interval in category 196. The user's receiver 64 will send viewing preference information to "Fred" at telephone number "555-1234" on a weekly basis. The weekly sharing of preference information to Fred can proceed automatically without the user's involvement or can proceed only after the verification by the user, as will be discussed further with respect to FIG. 12. A user selects the most convenient option.

The "How Much Detail?" category 198 allows a user to control the amount of viewing preference information to share with the destination. For privacy reasons, a user may not wish to share the entire contents of his/her user-specific sub-history table. Instead, a user may only wish to share a summary of the attributes contained therein. A summary would not include the titles of the viewed television programs or the channel definitions of the channels where the program was shown, but would include certain attributes of the viewed programs so that only a user's general viewing preferences would be communicated to others. A user could further restrict the amount of information communicated to others by specifically selecting contents of its sub-history table to be sent.

Figure 12:
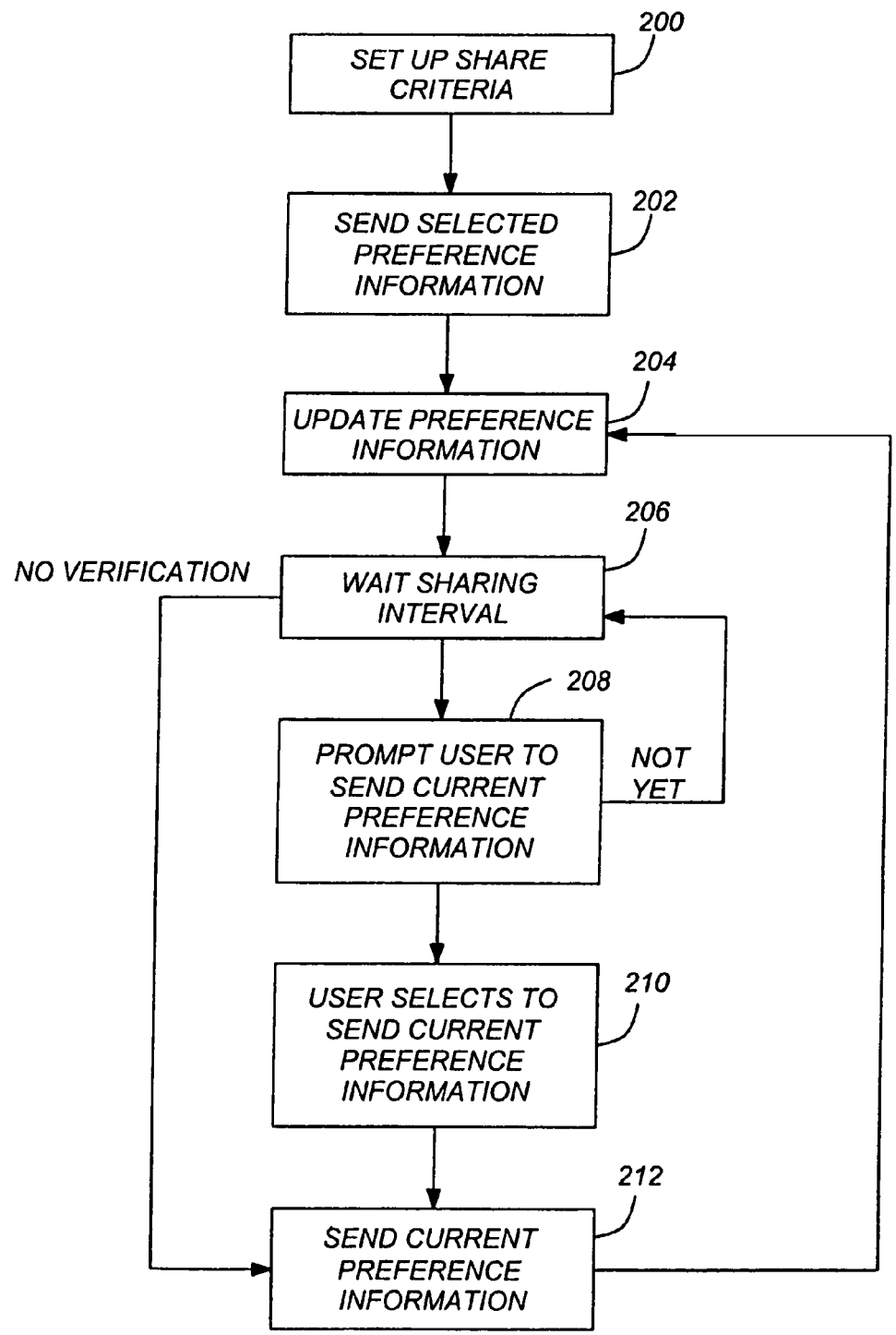
FIG. 12 is a flow diagram illustrating an automatic sharing feature.

FIG. 12 is a flow diagram that illustrates the automatic sharing feature of the present invention. As part of the set-up process for sending viewing preference information to a destination, a user selects a sharing interval, which is represented by box 200. A user is also allowed to select whether the future sharing will occur with or without user verification. After the setting-up process is complete, receiver 64 sends the selected preference information to the selected destination, which is represented by box 202. Receiver 64 continues to maintain and update a user's preference sub-history table by tracking the user's continued viewing history as described above (represented by box 204).

Receiver 64 continues to check clock 76 to determine if the selected sharing interval has passed, as represented by box 206. If it has not, receiver 64 continues to track and update a user's preference history. However, if the sharing interval has passed, then it is time to once again send viewing preference information to the respective destination. If a user has set up sharing features to include a user verification prior to sending preference information, then receiver 64 prompts a user that the sharing interval has elapsed and it is again time to share information with a particular destination, which is represented by box 208. A user approves sending preference information to the specified destination, as represented by box 210. Receiver 64 then sends the appropriate viewing preference information consistent with the previously selected security and privacy settings for the specific destination, which is represented by box 212.

If a user has set up sharing features for the specific destination without requiring user verification, then receiver 64 (after waiting the length of the sharing interval) automatically sends the appropriate viewing preference information to the particular destination without prompting the user. After sending viewing preference information to the destination, receiver 64 continues to update a user's viewing preference sub-history table by tracking the user's viewing history, which is represented by box 204, and the process repeats.

Figure 13:
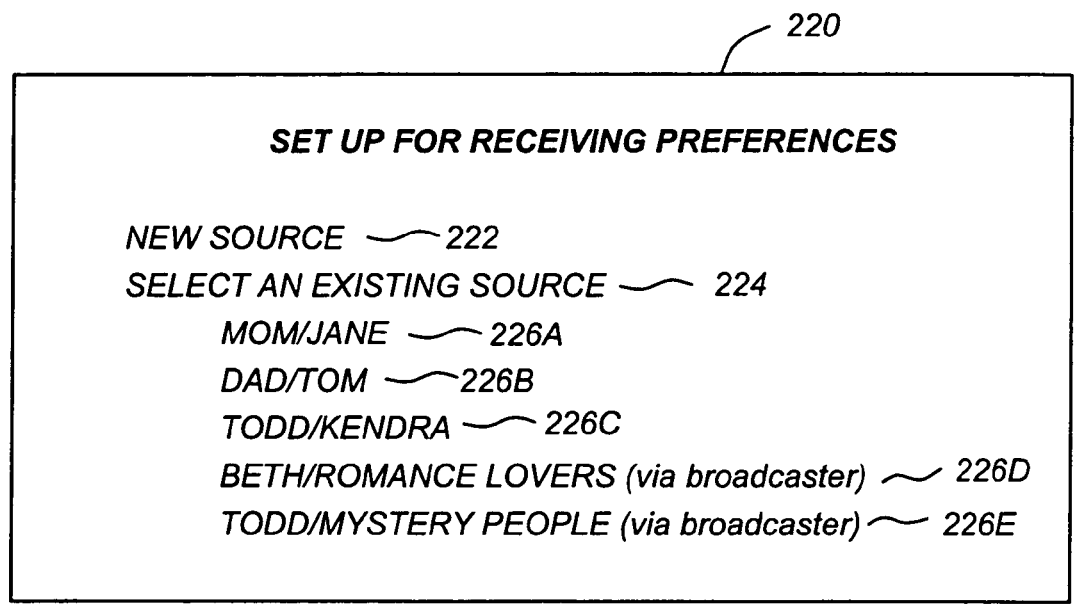
FIG. 13 is a diagram showing an example of a source selection screen.
Figure 14:
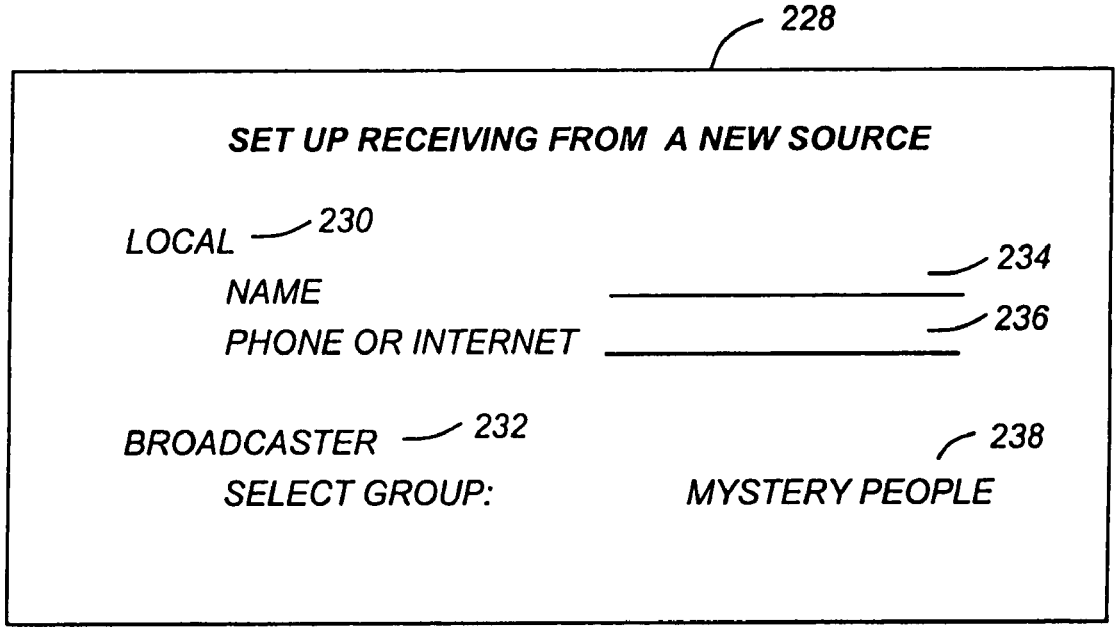
FIG. 14 is a diagram showing an example of a new source identification screen.
Figure 15:
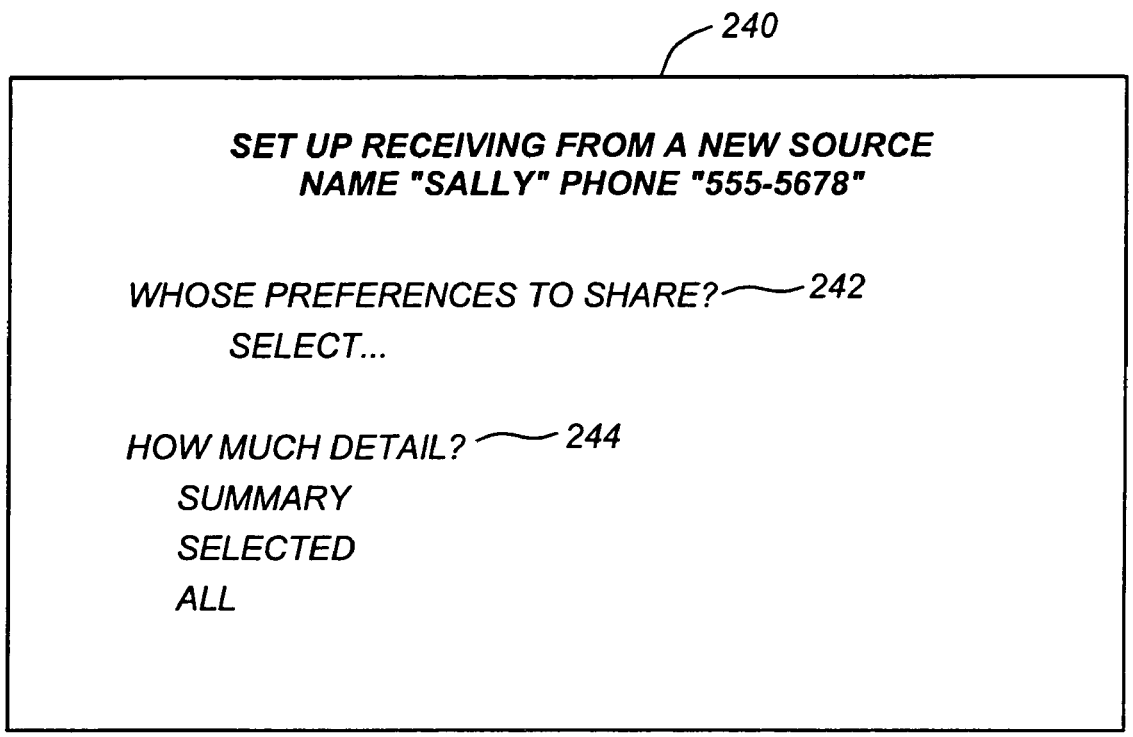
FIG. 15 is a diagram showing an example of a follow-on source set-up screen.

FIGS. 13-15 illustrate examples of screens displayed to a user during the process of setting-up criteria for receiving viewing preferences from another destination. FIG. 13 is an illustration of source selection screen 220 that allows a user to select a source with respect to which receiving criteria can be established or modified. This permits the user to designate which other users are permitted to transmit viewer preference information the user. Source selection screen 220 includes "New Source" option 222 and "Select An Existing Source" option 224. "Select An Existing Source" option 224 includes a list of existing sources 226A-226E (collectively referred to as existing sources 226).

Selection of "New Source" option 222 results in the user defining a new source destination from which a user will accept viewing preference information. Selection of "Select An Existing Source" option 224 allows a user to modify receiving criteria for an existing source 226. In this example, existing source destinations include individual users (226A-226C) and groups of users (226D-226E).

FIG. 14 is an illustration of an example of new source definition screen 228. New source definition screen 228 allows a user to select local source 230 or broadcaster source 232. A user defines an individual user as the new source by selecting local source 230. Local source 230 includes name input request 234 and telephone number or Internet address input request 236. A user chooses to receive viewing preference information from a group by selecting broadcaster source 232. Broadcaster source 232 includes a list of groups 238 from which a user selects a group. Upon selecting a new source, a user sets up security measures for accepting viewing preference information from the new source.

FIG. 15 is an illustration of an example of follow-on screen 240 that allows a user to define security and privacy type criteria for receiving viewing preference information from a particular source destination. In the present example, follow-on screen 240 relates to a newly defined source destination referred to by the name "Sally" located at telephone number "555-5678." Follow-on screen 240 includes "Where To Store Preferences" category 242 and "How Much Detail?" category 244.

Category 242 allows a user to select where the incoming viewing preference information from the particular source destination will be stored. The user may choose to merge the incoming viewing preference information from a particular source into his or her own preference sub-history table. Alternatively, a user may wish to store the incoming preference information in a different already existing user-specific sub-history table. However, the user may choose to create a new user-specific (or source-specific) sub-history table to store received viewing preference information. Keeping distinct and segregated viewing preference databases for different sources allows receiver 64 to provide source specific program guides, advertising and conditional channel content. Once merged viewer preference information is derived, it may be transmitted to the first user, if desired.

Similar to the sending set-up procedure described above, category 244 allows a user to tailor what kind and how much information from a particular source to accept and store. For security and convenience reasons, a user may wish not to accept entire contents of a sent selection history database. In such a case, a user preferably restricts the type and amount of viewing preference information that it will accept by selecting options within category 244. A user can choose to accept an entire viewing history, summary information, selected attributes, of the incoming viewer preference information, or any combination thereof. A user may wish to use extra caution with respect to accepting group viewing preference information sent from a group server due to increased potential that tainted information could be received.

Sharing preference information allows users to share their viewing experiences and ultimately affect what their friends or acquaintances or other group members have an opportunity to see on their television. FIG. 16 illustrates an example of a preference selection screen 246. Preference selection screen 246 includes list 248 that contains a listing of the user-specific (or source-specific) sub-history tables within the selection history table maintained by receiver 64. A user selects any of the listed items from list 248 and receiver 64 generates a program guide that identifies programs with similar attributes to those contained in the preference table associated with the selected item.

The present invention allows a television broadcasting system to provide user specific program guide content, advertising, and channel content. Receivers 64 can generate program guides that find programs of interest to a particular user or to someone else of a user's choosing. Thus not only is a user able to conveniently see what programs of personal interest are scheduled to be aired, but the user is also able to see what programs friends or acquaintances would find interesting. A user can even review notes or comments sent by another person about a television program. The present invention enhances communication among users of television broadcasting systems and allows them to take the advice of others by choosing to watch the program that matches someone else's interests.

CONCLUSION

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method of sharing viewer preference information between a first user and at least one second user, comprising the steps of:
    storing first user viewer preference information characterizing media programs selected by the first user in a memory of a first user device; and
    transmitting at least a portion of the first user viewer preference information to a second user for storage in a memory of a second user device of the at least one second user;
    wherein the step of transmitting at least a portion of the viewer preference information comprises the steps of:
        accepting a first user selection of at least one second user designated to receive at least a portion of the first viewer preferences; and
        transmitting the first viewer preferences to the designated second user.

2. The method of claim 1, wherein the first user device and the second user device are receivers configured to receive the media programs.

3. The method of claim 1, wherein the first user viewer preference information describes programs viewed by the user for a duration between a minimum time and a maximum time.

4. The method of claim 1, further comprising the step of compiling first user viewer preferences.

5. The method of claim 4, wherein the step of compiling first user viewer preferences comprises the step of:
    accepting first user-input viewer preference information.

6. The method of claim 4, wherein the step of compiling first user viewer preferences comprises the step of:
    monitoring and storing first user viewer-selected media programs.

7. The method of claim 1, wherein the first user viewer preference information comprises a selection history including information selected from a group comprising:
    a subset of the selection history; and
    a summary of attributes of the selection history.

8. The method of claim 1, wherein the first user viewer preference information is transmitted directly to the second user device via a medium selected from a group comprising:
    the Internet; and
    a telephone.

9. The method of claim 1, wherein the step of transmitting at least a portion of the first user viewer preference information to the second user comprises the steps of:
    transmitting at least a portion of the first viewer preference information from the first user device to a third party; and
    transmitting at least a second portion of the first user viewer preference information from the third party to the second user.

10. The method of claim 9, wherein the step of transmitting at least a portion of the first user viewer preference information to the second user further comprises the step of:
    filtering the portion of the first user viewer preferences to generate the second portion of the first user viewer preferences.

11. The method of claim 9, wherein the third party is a broadcaster transmitting the media programs to the first user and the second user.

12. The method of claim 1, further comprising the steps of:
    receiving the transmitted portion of the first user viewer preference information; and
    storing the received portion of the viewer preference information in the memory of the second user device.

13. The method of claim 12, wherein the user viewer preference information includes information selected from a group comprising a subset of a selection history and a summary of attributes of the selection history, and the step of receiving the transmitted portion of the viewer preference information comprises the steps of:
  accepting a second user selection of first user viewer preference information from the subset of the selection history and the summary of attributes of the selection history; and
  receiving the selected first user viewer preference information.

14. The method of claim 12, further comprising the steps of:
  receiving advertising data in the second user device, the advertising data including at least one of a plurality of advertisements and information characterizing the advertisement; and
  presenting a set of the plurality of advertisements based upon a comparison between the information characterizing the advertisement and the first user viewer preference information.

15. The method of claim 12, further comprising the steps of:
  generating merged viewer preference information from the first user preference information and second viewer preference information; and
  transmitting the merged viewer preference information to the first user.

16. A method of sharing viewing preference information between a first user and at least one second user, comprising the steps of:
  receiving first user viewer preference information in a second user device, the first viewer preference information characterizing media programs selected by the first user and transmitted to the at least one second user by performing the steps of
    accepting a first user selection of at least one second user designated to receive at least a portion of the first viewer preferences; and
    transmitting the first viewer preferences to the designated second user; and
    storing the received first user viewer preference information in a memory of the second user device of the at least one second user.

17. The method of claim 16, wherein the first user viewer preference information includes information selected from a group comprising a subset of a selection history and a summary of attributes of the selection history, and the step of receiving the first user viewer preference information comprises the steps of:
  accepting a second user selection of first user viewer preference information from the subset of the selection history and the summary of attributes of the selection history; and
  receiving the selected first user viewer preference information.

18. The method of claim 16, further comprising the steps of:
  receiving advertising data in the second user device, the advertising data including at least one of a plurality of advertisements and information characterizing the advertisement; and
  presenting a set of the plurality of advertisements based upon a comparison between the information characterizing the advertisement and the first user viewer preference information.

19. The method of claim 16, further comprising the steps of:
  generating shared viewer preference information from the first user preference information and second viewer preference information; and
  transmitting the shared viewer preference information to the first user.

20. An apparatus for sharing viewing preference information between a first user and at least one second user, comprising: a first user device including:
  at least one receiver for receiving media programs;
  a processor, communicatively coupled to the receiver;
  a memory, communicatively coupled to the processor, for storing first viewer preference information characterizing media programs selected by the first user and for storing an instruction set for commanding the processor to accept a first user selection of at least one second user designated to receive at least a portion of the first viewer preferences;
  a transmitter, communicatively coupled to the processor, for transmitting the first viewer preference information to a second user device of the at least one second user.

21. The apparatus of claim 20, wherein the first user device further comprises a second receiver for receiving second user viewer preferences.

22. The apparatus of claim 20, wherein the first user device receiver further receives second user viewer preferences transmitted from the second user device via a broadcaster transmitting the media programs to the first user and the second user.

23. The apparatus of claim 20, wherein the memory comprises a first instruction set for commanding the processor to compile the first user viewer preferences.

24. The apparatus of claim 20, wherein the memory comprises a third instruction set for commanding the processor to accept a first user selection of at least one second user designated to transmit second user viewer preference information to the first user.

25. An apparatus for sharing viewer preference information between a first user and at least one second user, comprising:
  means for storing first user viewer preference information characterizing media programs selected by the first user in a memory of a first user device; and
  means for transmitting at least a portion of the first user viewer preference information to a second user for storage in a memory of a second user device of the at least one second user;
  wherein the means for transmitting at least a portion of the viewer preference information comprises:
    means for accepting a first user selection of at least one second user designated to receive at least a portion of the first viewer preferences; and
    means for transmitting the first viewer preferences to the designated second user.

26. The apparatus of claim 25, wherein the first user device and the second user device are receivers configured to receive the media programs.

27. The apparatus of claim 25, wherein the first user viewer preference information describes programs viewed by the user for a duration between a minimum time and a maximum time.

28. The apparatus of claim 25, further comprising means for compiling first user viewer preferences.

29. The apparatus of claim 28, wherein the means for compiling first user viewer preferences comprises:

means for accepting first user-input viewer preference information.

30. The apparatus of claim 28, wherein the means for compiling first user viewer preferences comprises:
means for monitoring and storing first user viewer-selected media programs.

31. The apparatus of claim 20, wherein the first user viewer preference information comprises a selection history including information selected from a group comprising:
a subset of the selection history; and
a summary of attributes of the selection history.

32. The apparatus of claim 25, wherein the first user viewer preference information is transmitted directly to the second user device via a medium selected from a group comprising:
the Internet; and
a telephone.

33. The apparatus of claim 25, wherein the means for transmitting at least a portion of the first user viewer preference information to the second user comprises:
means for transmitting at least a portion of the first viewer preference information from the first user device to a third party; and
means for transmitting at least a second portion of the first user viewer preference information from the third party to the second user.

34. The apparatus of claim 33, wherein the means for transmitting at least a portion of the first user viewer preference information to the second user further comprises:
means for filtering the portion of the first user viewer preferences to generate the second portion of the first user viewer preferences.

35. The apparatus of claim 33, wherein the third party is a broadcaster transmitting the media programs to the first user and the second user.

36. The apparatus of claim 25, further comprising:
means for receiving the transmitted portion of the first user viewer preference information; and
means for storing the received portion of the viewer preference information in the memory of the second user device.

37. The apparatus of claim 36, wherein the user viewer preference information includes information selected from a group comprising a subset of a selection history and a summary of attributes of the selection history, and the means for receiving the transmitted portion of the viewer preference information comprises:
means for accepting a second user selection of first user viewer preference information from the subset of the selection history and the summary of attributes of the selection history; and
means for receiving the selected first user viewer preference information.

38. The apparatus of claim 36, further comprising:
means for receiving advertising data in the second user device, the advertising data including at least one of a plurality of advertisements and information characterizing the advertisement; and
means for presenting a set of the plurality of advertisements based upon a comparison between the information characterizing the advertisement and the first user viewer preference information.

39. The apparatus of claim 36, further comprising:
means for generating merged viewer preference information from the first user preference information and second viewer preference information; and
means for transmitting the merged viewer preference information to the first user.

40. A program storage device, readable by a computer, tangibly embodying at least one program of instructions executable by the computer to perform method steps of sharing viewer preference information between a first user and at least one second user, the method steps comprising the steps of:
storing first user viewer preference information characterizing media programs selected by the first user in a memory of a first user device; and
transmitting at least a portion of the first user viewer preference information to a second user for storage in a memory of a second user device;
wherein the step of transmitting at least a portion of the viewer preference information comprises the steps of:
accepting a first user selection of at least one second user designated to receive at least a portion of the first viewer preferences; and
transmitting the first viewer preferences to the designated second user.

* * * * *